Jan. 22, 1957 L. D. STATHAM 2,778,624
ANGULAR ACCELEROMETER
Filed May 24, 1954 4 Sheets-Sheet 2

INVENTOR.
LOUIS D. STATHAM
BY
ATTORNEY.

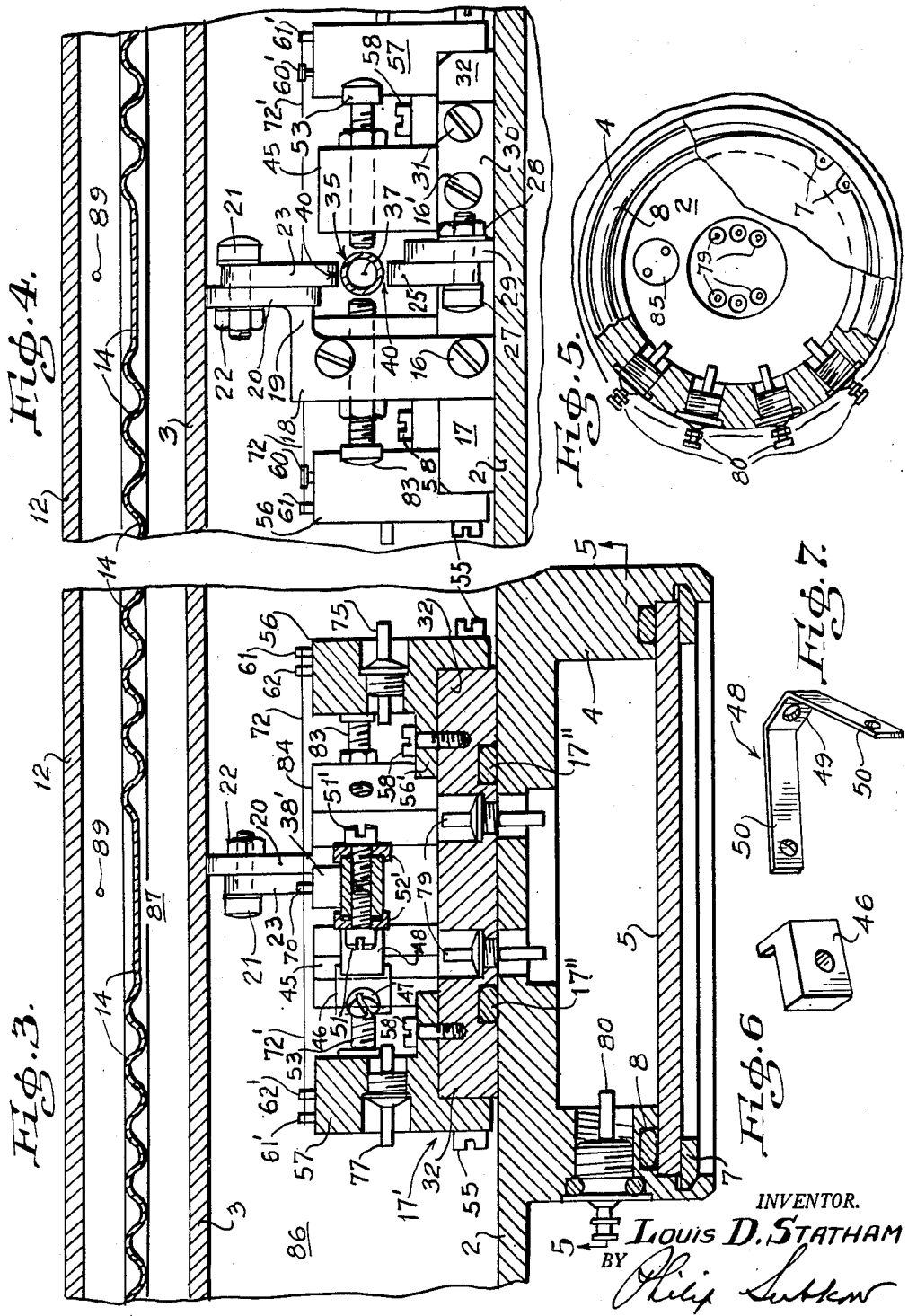

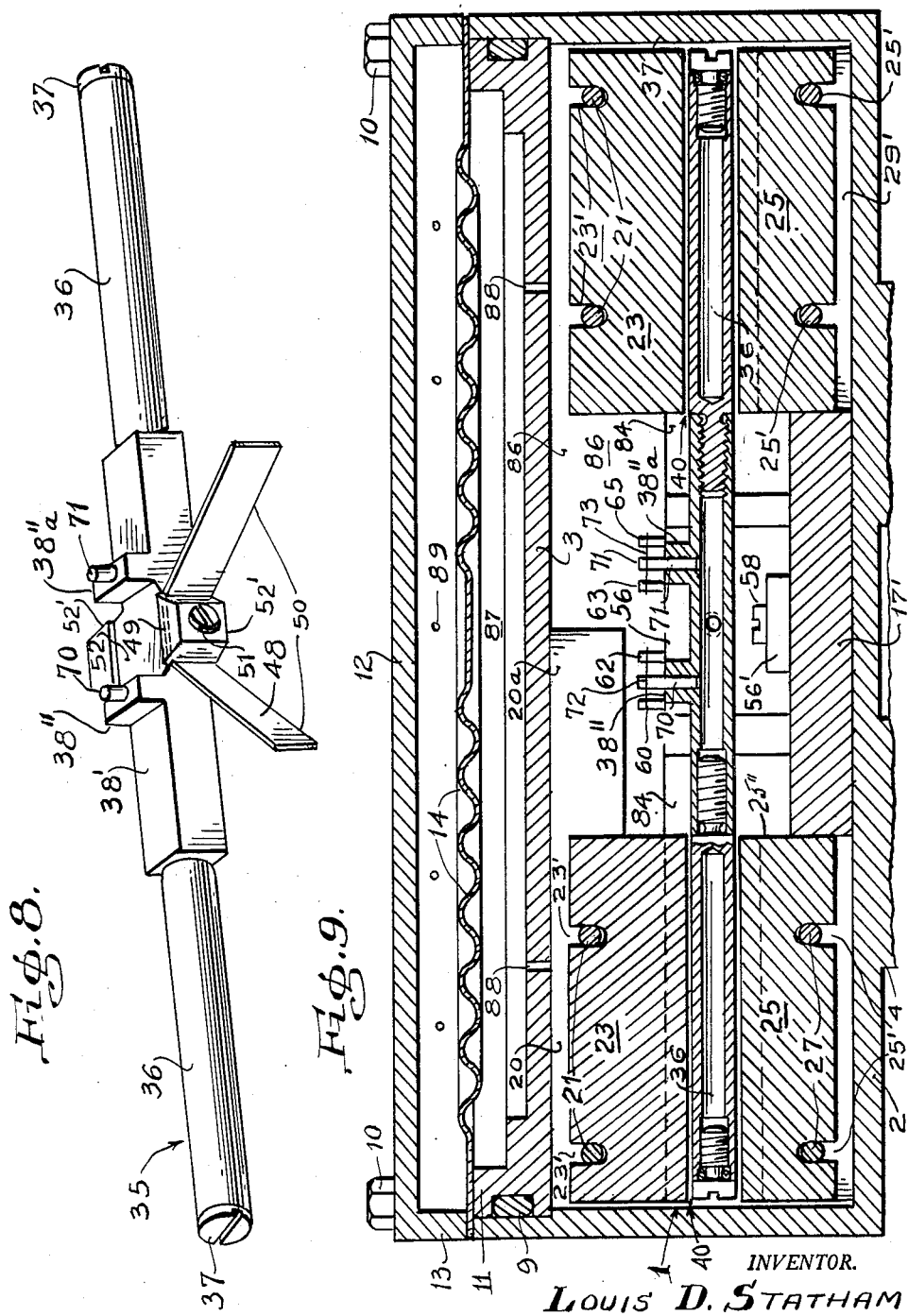

2,778,624

ANGULAR ACCELEROMETER

Louis D. Statham, Beverly Hills, Calif., assignor to Statham Laboratories, Inc., Los Angeles, Calif., a corporation of California Application May 24, 1954, Serial No. 431,764

17 Claims. (Cl. 264—1)

This application is a continuation-in-part of applications Serial No. 241,539, filed August 13, 1951, and Serial No. 328,416, filed December 29, 1952.

This invention relates to a motion responsive device for indicating and recording the magnitude and nature of motions of an object in space. It belongs to the general class of motion sensing devices such as accelerometers.

The conventional examples of such systems include devices in which the effective inertial mass is a solid mass suspended on springs and the nature and magnitude of the displacement of the mass on the springs are a measure of the magnitude and nature of the motion.

Instead of using a solid mass suspended on springs, as in the prior art, I employ a liquid mass as the effective inertial mass and measure displacement of the liquid mass relative to the container subjected to the motion to be sensed.

Since I use a liquid mass instead of a solid inertial mass, I may use a large mass without introducing a large hinge, such as would be necessary were I to use a solid mass of equivalent weight. Such a large weight would require a large hinge or pivots or springs in order to withstand mechanical shocks. Because as stated above I use, as the effective inertial mass, a liquid mass and do not employ a solid mass as the effective inertial mass, I avoid the use of hinges and pivots of the size necessary where the effective inertial mass is solid rather than liquid.

By placing a movable member immersed in the liquid and mounted for motion relative to the liquid in the container, the relative motion of the liquid and the container wall will cause the movable member to be displaced, as a result of a difference in pressure on both sides of the movable member. The movable member is thus displaced in the direction of the flow of liquid relative to the container. By mounting the member so that it is movable relative to the container body, the relative displacement of the container and liquid will produce a thrust on the movable member resulting from the relative displacement of the liquid and the container for the liquid.

The motion of the liquid is damped by viscous drag. In order to increase the damping effect, I have added an additional damping means, by causing the fluid to flow through an orifice, so that a passage of liquid occurs on the passage of the liquid through the orifice as a result of the relative motion of the liquid and the container walls. The result of this arrangement not only gives an additional damping effect but has the property that it tends to maintain a more nearly constant damping coefficient for the instrument, notwithstanding temperature changes and consequent changes in viscosity of the liquid, than would be obtained if the orifice is not employed.

Additionally by providing an endless liquid conduit over the movable member and around the container of the system, so that a circulation of the liquid is obtained, the device will sense progressive increases in the displacement of the liquid mass and the container on increase of the magnitude of the function of the motion to which the device is responsive. The limit of this increase is set by the permissible displacement of the paddle as imposed by the nature of the device used to check the motion of the paddle.

In the instant invention the liquid mass serves as the rotor so that the weight of the paddle which must be supported along the sensitive axis can be made extremely low. Baffles are fixedly mounted above and below the paddle, such baffles being disposed parallel to the axis of the paddle and spaced closely adjacent thereto. Thus, the separation between the edges of the paddle and the inner chamber walls form fluid communication passageways, and the spaces between the baffles and paddles form another series of fluid communicating passages. When the instrument is subjected to an angular acceleration, the inertial forces will cause the liquid to rotate and develop a pressure against the paddle as the liquid is forced between the edges of the paddle and the adjacent walls of the container, and between the paddle and the baffles. The paddle will deflect angularly until the elastic restraint of the flexure and the pickoff (mechanism for sensing the motion) balances the forces on the paddle. The novel structure of the invention can be readily adapted to the use of a variety of pickoff mechanisms.

It is not necessary for the paddle to have any substantial mass; all that is required is that it be structurally rigid. Preferably and ideally, the weight of the paddle in air may be made equal to the weight of the liquid displaced by the paddle when it is mounted in the device where it is immersed in the liquid forming the effective inertial mass. Such a paddle may be termed buoyant. Accordingly, the paddle is preferably constructed as a hollow member with sealed ends so that its weight, when immersed in the liquid, is relatively small, and ideally may be made substantially equal to zero. The buoyancy reduces the weight of the paddle in liquid. The use of a buoyant paddle also eliminates the necessity for careful balance of the suspended mass to minimize the sensitivity of the instrument to linear accelerations. It also reduces the effect of angular velocity on the displacement of the paddle and if the paddle has an insubstantial submerged mass, the paddle may be made insensitive to angular velocity.

These and other features and objects of my invention will be further described in connection with the accompanying drawings, wherein:

Fig. 3 is a vertical section on line 3—3 of Fig. 2;

Fig. 4 is an irregular section on line 4—4 of Fig. 2;

Fig. 5 is a view taken on line 5—5 of Fig. 3, looking in the direction of the arrows;

Fig. 6 is a perspective view of an element of the invention device;

Fig. 7 is a perspective view of another element of the device;

Fig. 8 is an isometric view of the paddle assembly of the device; and

Fig. 9 is a section taken on line 9—9 of Fig. 1.

Figure 1:
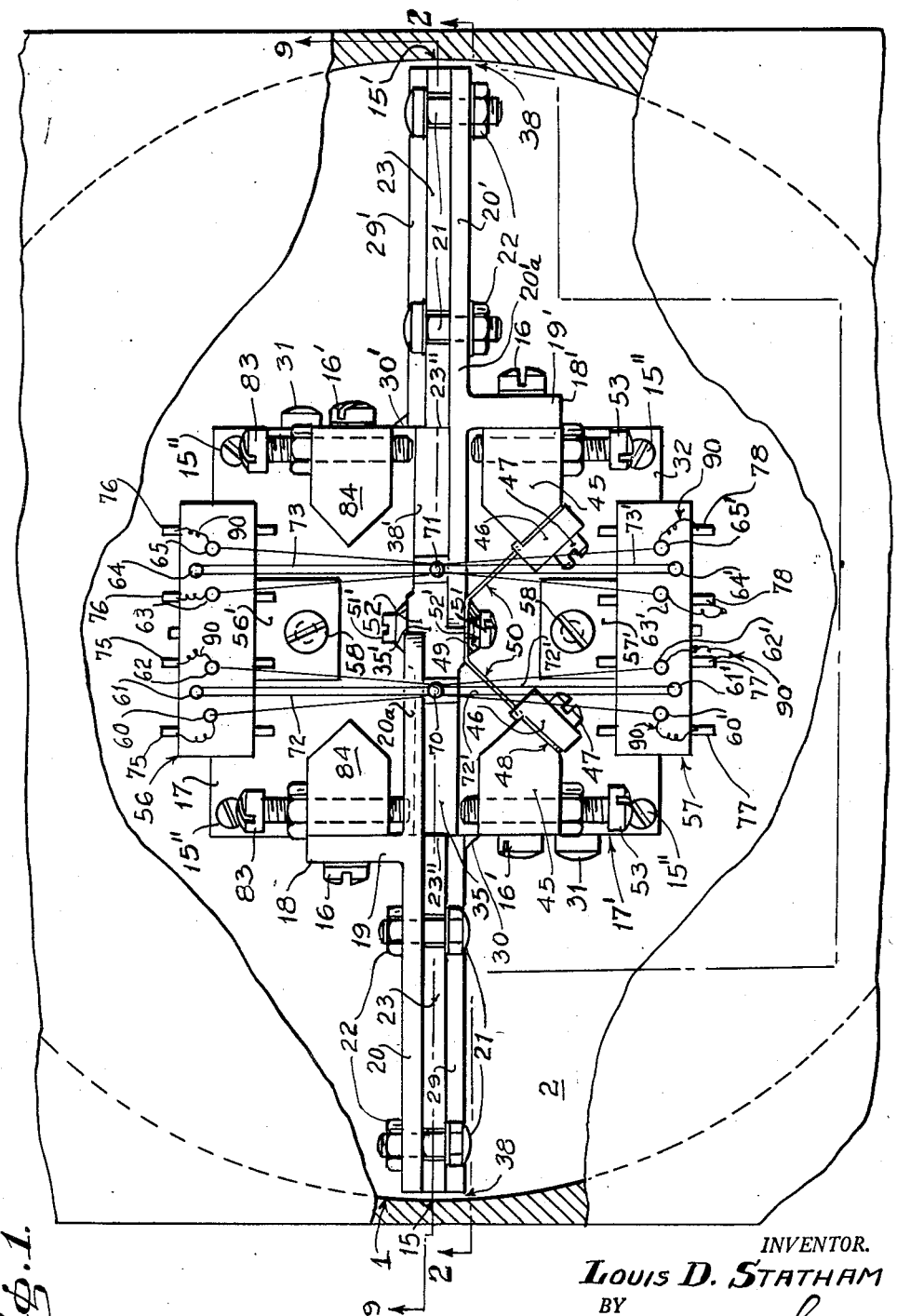
Fig. 1 is a plan view of a preferred embodiment of my invention, with parts broken away and parts in section for clarity.
Figure 2:
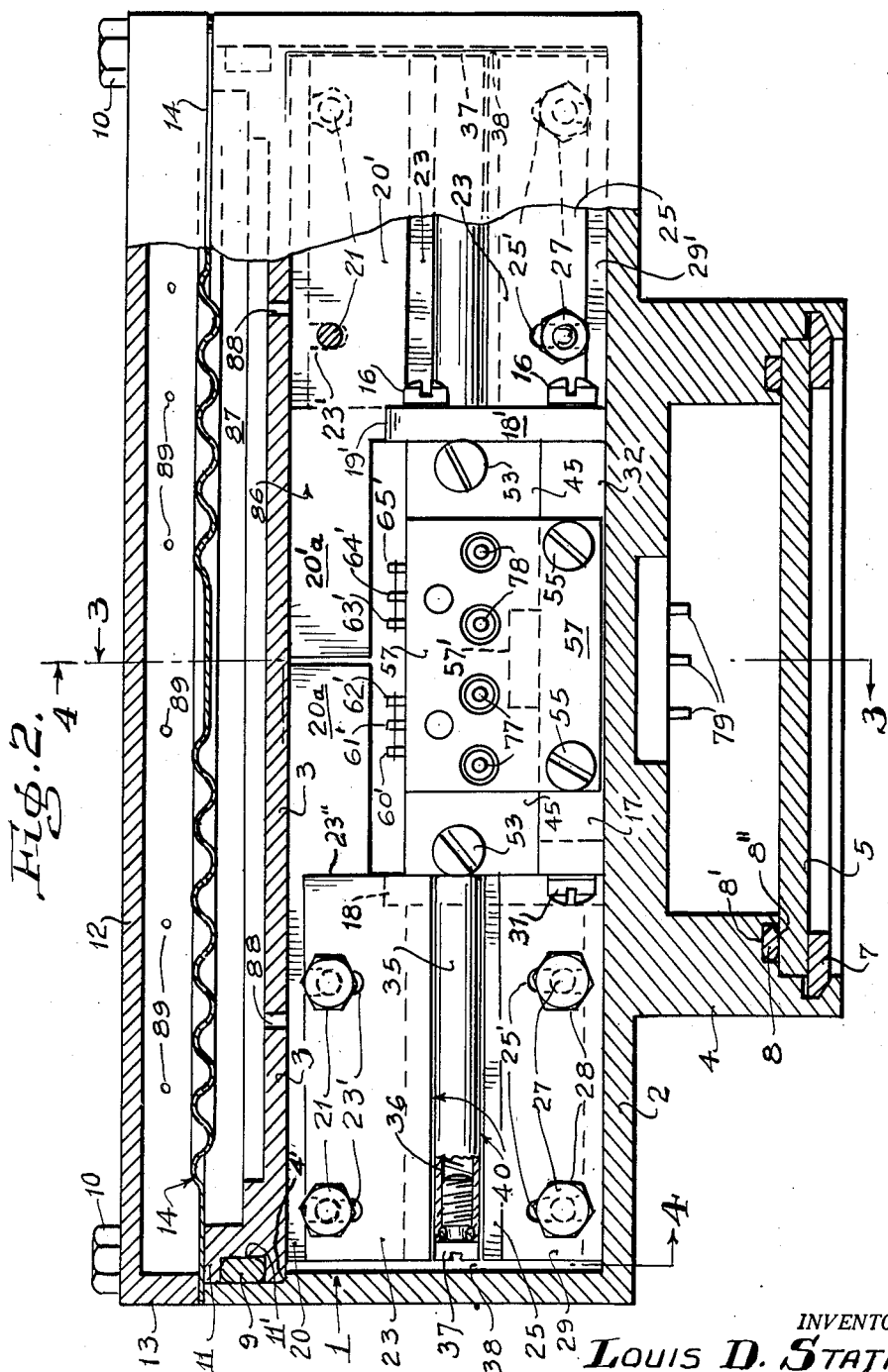
Fig. 2 is a vertical broken section taken on line 2—2 of Fig. 1.

Referring particularly to Figs. 1 and 2, the container 1 is shown as a cylinder, but may be of any shape provided that it is a closed container. The container is closed by a bottom 2 and a top 3. The bottom 2 carries a depending circular flange 4, to the lower end of which is secured a removable cover 5, held in place by snap ring 7 maintained in a suitable groove in flange 4. An O ring 8 is positioned in a groove 8' located in a horizontal shoulder 8" intermediate the sides of flange 4. The top 3 is held in position on the upper wall of the case 1, with the lower end portion of member 3 resting on a horizontal shoulder 4' formed by a recess in the wall. Secured to top 3 by means of bolts 10 passing through an outer upwardly extending flange 11 of the top 3, is a cover 12 having a depending flange 13. Positioned between the lower end of flange 13 and the top of flange 11 is a flexible diaphragm 14 held in place by the bolts 10. Flange 11 has an annular recess 11' therein to accommodate an O ring 9 for sealing purposes.

As seen in Figs. 1, 2 and 4, a square bracket member 17' comprising half bracket portions 17 and 32 is attached to the base 2 by means of screws 15" located at the corners of member 17'.

An O ring seal 17" (see Fig. 3) is disposed in an annular groove in the lower surface of member 17' in contact with the bottom 2. Secured by means of bolts 16 to opposite sides of bracket portions 17 and 32, respectively, are a pair of supports 18 and 18', each having a horizontally extending upper portion 19 and 19'. Upwardly extending plates 20 and 20' are integrally secured to the ends of each of portions 19 and 19' of supports 18 and 18', each of such plates extending substantially into contact with top 3 and extending outwardly across the container, the outer edges of the plates 20 and 20' being spaced a short distance from the adjacent container wall sections 15 and 15'.

As is seen in Fig. 2, plates 20 and 20' extend inwardly almost to the center of the container, their inner edges being located closely adjacent each other and their inner portions 20a and 20'a being reduced in size to accommodate the strain wire transducer structure as shown in Fig. 9 and described below. Secured to each of plates 20 and 20' by bolts 21 and nuts 22 is a baffle 23, the lower ends of which extend somewhat below the lower ends of plates 20 and 20'. Bolts 21 pass through slots 23' in baffles 23, the slots being provided for vertical adjustment of the baffles to vary the distance between the lower edges of the baffles and the paddle 35 described below. Baffles 23 extend in alignment with each other along a diameter of the container 1 and their outer ends are located adjacent the respective opposite ends of plates 20 and 20', the outer edges of the baffles and plates 20 and 20' being spaced a short distance from the adjacent container walls. The inner edges 23" of baffles 23 are located directly above the opposite side edges of bracket member 17'.

A pair of lower baffles 25 of approximately the same length as baffles 23 are positioned directly below and in alignment with the upper baffles 23, the upper longitudinal edges of baffles 25 being spaced from and parallel to the adjacent lower longitudinal edges of baffles 23. The outer edges of baffles 25 are also spaced a short distance from the container wall sections 15 and 15', although if desired, the outer edges of either or both baffles 23 and 25, or of either or both plates 20 and 20' may touch the adjacent wall sections. The inner ends 25" of baffles 25 abut against opposite sides of bracket member 17' (see Fig. 9). Baffles 25 are secured by means of bolts 27 and nuts 28 to plates 29 and 29' located at opposite sides of container 1 and in vertical alignment with plates 20' and 20, respectively. Bolts 27 pass through slots 25' in baffles 25 for vertical adjustment of the baffles. Plates 29 and 29' are attached to a pair of opposite support members 30 and 30', respectively, which support members are in turn respectively secured by means of bolts 31 to opposite sides of bracket portions 32 and 17.

Positioned in the space between and parallel to the adjacent longitudinal edges of baffles 23 and 25 (see Figs. 2, 4, 8 and 9), is a buoyant paddle 35 of low weight in the aforementioned liquid, the paddle extending diametrically of the cylindrical container. The paddle is generally in the form of an elongated hollow member with the ends sealed. The paddle of the instant embodiment is shown as being formed of two aligned hollow cylinders 36 with their outer ends sealed by threaded caps 37. The inner adjacent ends of reduced diameter of cylinders 36 are each threaded as at 37' into opposite ends of a central hollow oblong paddle mount 38'. However, a paddle of any structural shape or configuration may be employed according to the invention, so long as the weight of the paddle in the liquid is maintained small according to the invention. Theoretically, it is not necessary for the paddle to have any apparent weight when submerged in the liquid; i. e., it may be completely buoyant; all that is required is that it be structurally rigid. The paddle may be constructed of any material conferring the foregoing mass characteristics on the paddle, such as magnesium, aluminum, plastic and the like. The reason for this is that the liquid mass, as will be more clearly seen hereinafter, serves as the rotor.

The outer edges of the paddle 35 may touch the adjacent wall sections 15 and 15' so long as the paddle is free to rotate over the wall. However, this will reduce the resolution of the instrument, and it will not respond to as low values of acceleration change as when such end gaps are provided. In the preferred embodiment of my invention both ends 37 of the paddle are spaced from the wall sections 15 and 15' to give orifices 38 of size to produce the desired damping effect.

Although some damping is obtained by reason of the orifices 38 between the ends of the paddle and the adjacent wall sections of the container as described above, an additional damping effect is obtained along with a high natural frequency according to the instant improvements by reason of the parallel slots 40 formed between the paddle and the adjacent edges of baffles 23 and 25. The spacing between the buoyant paddle and the two stationary baffles is important because as these gaps are increased in area, the damping ratio at any given temperature for any given oil in the instrument will increase in value.

When the instrument is subjected to an angular acceleration, the liquid in the gaps or slots 40 acquires velocities greatly in excess of the velocity of the main mass of the liquid rotor. Since the kinetic energy of the liquid in the gaps is proportional to the square of the velocity, despite the low mass of the liquid in the gaps, a reduction in the natural frequency of the instrument will result as the gap size is diminished. Experimental observations show that an optimum size of the gaps 40 may be attained where no spurious modes of vibration are discernible with no appreciable reduction in natural frequency.

These instruments which in common with the instruments described in the companion cases, have the following properties: The range of the device, i. e., the maximum acceleration to which the device is sensitive is directly proportional to the active oil height, e. g., the diameter of the paddle plus approximately one-half (½) the total gap between the paddle and baffles. The natural frequency is inversely proportional to the active oil height. The natural frequency varies directly as the range, as compared with the system in which the resiliently suspended solid is the effective inertial mass, in which case the natural frequency varies directly as the square root of the range. Thus keeping all other parameters constant, the range of the instrument increases as the active oil height and the total elastic restraint (spring constant) each increase, and decreases as the paddle increases in length. In like manner when natural frequency increases, the greater is the length of the paddle. The natural frequency decreases as the paddle diameter increases.

The paddle 35 is mounted on a leaf spring type Cardan suspension so as to pivot on the central axis of the container 1. The pivoted mounting shown in Fig. 1 consists of angularly placed lugs 45 mounted on bracket 32 by means of bolts 16 and 16'. Secured to the angular lugs by means of clamps 46 (see Fig. 6) and bolts 47 passing through them is a V-shaped spring 48 (see Fig. 7) having a planar base 49, the angles formed by the legs 50 of the V and the base being equal. The base of the spring is connected by a screw 51 to the central hub 52 of the paddle 35 so as to put the axis of the paddle on a line passing through the diameter of the cylindrical container. The paddle 35 can thus pivot about the central axis of the container on the spring 48. The angular motion of the paddle is limited by means of two limit motion stop screws 53 which may be adjusted on the lugs 45.

The hub 52 of the paddle has a symmetrical boss 52' on opposite sides of the hub, and a screw 51' of the same weight and contour as screw 51 is fastened to the opposite side of the hub. This hub structure makes the paddle completely symmetrical, that is, the paddle is completely balanced in weight and is symmetrical in form about a longitudinal axis through the central axis of the cylindrical paddle and also about an axis perpendicular thereto and passing through the paddle pivot point 35' which is substantially at the intersection of the legs 50 of spring 48. While the paddle is substantially completely balanced in the embodiment shown, if desired, an additional spring such as 48 may be connected to the hub 52 of the paddle directly opposite and in the same manner as spring 48, and suspended in a similar manner with the legs of the additional spring secured to lugs 84 on bracket 17.

Connected to opposite ends respectively of brackets 17 and 32 by means of screws 55 are a pair of blocks 56 and 57. Blocks 56 and 57 have longitudinally extending brackets 56' and 57' integrally connected to the lower portions thereof, these brackets resting on and being secured to the square bracket 17' by means of screws 58. Block 56 carries two sets of pins, one set being positioned adjacent the other. One set of such pins consists of three pins 60, 61, and 62, pin 61 being positioned between but farther from paddle 35 than pins 60 and 62. The other set of pins also consists of three pins 63, 64 and 65 located with respect to each other similarly to pins 60, 61 and 62, intermediate pin 64 being positioned directly opposite intermediate pin 61, i. e., on a line parallel to the axis of paddle 35. Block 57 also carries two adjacent sets of pins, one set being composed of three pins, 60', 61' and 62', situated similarly to and directly opposite (i. e. on a line normal to the axis of paddle 35) pins 60, 61 and 62 on block 56, and the other set consisting of pins 63', 64' and 65' located similarly to and directly opposite pins 63, 64 and 65 on block 56. Positioned on a lug 38" formed on paddle mount 38" (see Fig. 9) in a plane normal to the axis of the paddle and passing through pins 61 and 61' is a pin 70, and also located on lug 38"a on the paddle mount in a plane normal to the axis of the paddle and passing through pins 64 and 64' is a pin 71.

A strain sensitive wire 72 is wound in tension between pins 61 and 70 in a loop, one end of the loop terminating at pin 60 and the other end terminating at pin 62. A strain wire 72' is also wound in tension between pins 61' and 70 in a loop, one end of the loop terminating at pin 60' and the other end terminating at pin 62'. In the same manner a strain wire 73 is wound in tension in a loop between pins 64 and 71, the opposite ends of the wire terminating at pins 63 and 65; and a strain wire 73' is wound in tension in a loop between pins 64' and 71, the opposite ends of the wire terminating at pins 63' and 65'. All the pins are electrically insulated and the wires are out of contact with the frame and with each other. The ends of each of the four wires 72, 73, 72' and 73' are respectively connected by conductors such as 90, to four pairs of terminals 75, 76, 77 and 78 located in blocks 56 and 57, which terminals in turn are connected by conductors (not shown) to terminals 79 (see Fig. 3) extending through bottom 2 of the device. The latter terminals are connected in a conventional Wheatstone bridge arrangement to the four outer terminals 80 located on the periphery of flange 4.

It will be seen that angular motion of the paddle 35, e. g., in a clockwise direction as viewed in Fig. 1, will cause pin 70 to move toward block 56 and away from block 57, and will cause pin 71 to move toward block 57 and away from block 56. This action relaxes the tension in wires 72 and 73', and increases the tension in wires 72' and 73, since the pins on blocks 56 and 57 are stationary. If the mass of liquid in the container causes the paddle to move counterclockwise, wires 72 and 73' are increasingly tensioned and the tension in wires 72' and 73 is relaxed. Suitable motion limiting stop screws 83 pass through lugs 84 secured to the bracket 17 by screws 16 and 16'.

The case or container 1 may be completely filled with liquid through a fill hole stoppered by a screw 85 (see Fig. 5) and the fluid enters and fills the chamber 86 between the bottom and top members 2 and 3 of the device, and passes into and fills the chamber 87 underneath the diaphragm 14 through ports 88. Suitable air breather holes 89 are provided in the flange 13.

The liquid employed may be any liquid but, I desire to choose a fluid having a low viscosity temperature susceptibility even though it be of low density, particularly if it have also a low value of its cubical coefficient of expansion, rather than to choose a liquid of high viscosity temperature susceptibility and high density, particularly if it also have a high value for its cubical coefficient of expansion. This leads me to select as my preferred liquid an oil and preferably the synthetic silicone polymers which have flat viscosity temperature lines on the ASTM chart. Thus, by a proper selection of the magnitude of the design parameters of my instrument as described above, I may select the desired damping ratio which will remain sensible constant over a wide range of viscosities of the damping oil.

A higher natural frequency for a given range can be obtained in the device described herein by increasing the diameter of the liquid rotor. Further, a higher natural frequency can be obtained for a given diameter of case and for a specific range by increasing the ratio of height of liquid mass to height of the paddle.

While I have disclosed an electrical resistance strain gage type transducer as the motion-sensing device, it will be understood by those skilled in the art that any other suitably designed transducer, such as an inductive type transducer illustrated in my above noted application Serial No. 328,416, or other equivalent devices may be employed.

While I have described a particular embodiment of my invention for the purpose of illustration, it should be understood that various modifications and adaptations thereof may be made within the spirit of the invention as set forth in the appended claims.

I claim:

1. A motion sensing device, comprising a case, a closed chamber in said case, a liquid inertial mass in said chamber, a paddle in said chamber immersed in said liquid, said paddle being of substantially no effective mass when immersed in said liquid, said liquid being the inertial mass and the effective rotor of said device, a mounting for said paddle fixedly mounted in said chamber and connected to said case, said paddle being movably mounted in said chamber with one edge of said paddle adjacent, but out of contact with, an enclosing wall of said chamber, the separation between the edge of the paddle and said wall forming a fluid communicating passageway, said paddle being positioned on said mounting for limited motion on said mounting with respect to said case on acceleration of said case, said mounting restraining motion of said paddle with respect to said case in the absence of acceleration of said case, and means for sensing said motion.

2. In the device of claim 1, said paddle extending across said chamber with the opposite edges of said paddle adjacent, but out of contact with, an enclosing wall of said chamber and a baffle positioned in said chamber extending along said paddle and spaced therefrom, the space between said baffle and said paddle forming a fluid communicating passageway in said chamber from one side of said paddle to the other side.

3. A motion sensing device, comprising a case, a closed chamber in said case, a liquid inertial mass in said chamber, a paddle in said chamber immersed in said liquid, said paddle being of substantially no effective mass when immersed in said liquid, said liquid being the inertial mass and the effective rotor of said device, a mounting for said paddle fixedly mounted in said chamber and connected to said case, said paddle being movably mounted in said chamber with one edge of said paddle adjacent, but out of contact with, an enclosing wall of said chamber, a baffle positioned in said chamber extending along said paddle and spaced therefrom, a liquid communication passageway for fluid movement from one side of said paddle to the other side of said paddle and between the edge of said paddle and said wall and between said paddle and said baffle, said paddle being positioned on said mounting for limited angular motion on said mounting with respect to said case on angular acceleration of said case, said mounting restraining motion of said paddle with respect to said case in the absence of angular acceleration of said case, and means for sensing said motion.

4. A motion sensing device, comprising a case, a closed chamber in said case, said chamber being in the form of a cylinder and having opposing cylindrical walls, a liquid inertial mass in said chamber, a paddle of substantially no effective mass when immersed in said liquid, said liquid being the inertial mass and the effective rotor of said device, a spring hinge for said paddle, said spring hinge being connected to said paddle, a mounting in said chamber for said hinge, said mounting being connected to said case and to said hinge, said paddle being rotatably mounted about said spring hinge on the axis of said cylinder for limited angular motion of said paddle about the said axis and with respect to said case on angular acceleration of said case, said hinge restraining motion of said paddle with respect to said case in the absence of angular acceleration of said case about said axis, said paddle extending from one wall to the opposing wall and immersed in said liquid, opposing edges of said paddle being adjacent the opposing cylindrical walls, and a motion sensing device connected to said paddle to sense the angular displacement of said paddle.

5. A motion sensing device, comprising a case, a closed chamber in said case, said chamber being in the form of a cylinder and having opposing cylindrical walls, a liquid inertial mass in said chamber, a paddle of substantially no effective mass when immersed in said liquid, said liquid being the inertial mass and the effective rotor of said device, a spring hinge for said paddle, said spring hinge being connected to said paddle, a mounting in said chamber for said hinge, said mounting being connected to said case and to said hinge, said paddle being rotatably mounted about said spring hinge on the axis of said cylinder for limited angular motion of said paddle about the said axis and with respect to said case on angular acceleration of said case, said hinge restraining motion of said paddle with respect to said case in the absence of angular acceleration of said case about said axis, said paddle extending from one wall to the opposing wall and immersed in said liquid, opposing edges of said paddle being adjacent the opposing cylindrical walls, an edge of said paddle being spaced from the adjacent cylindrical wall of the chamber, and a motion sensing device connected to said paddle to sense the angular displacement of said paddle.

6. A motion sensing device, comprising a case, a closed chamber in said case, said chamber being in the form of a cylinder and having opposing cylindrical walls, a liquid inertial mass in said chamber, a paddle of substantially no effective mass when immersed in said liquid, said liquid being the inertial mass and the effective rotor of said device, a spring hinge for said paddle, said spring hinge being connected to said paddle, a mounting in said chamber for said hinge, said mounting being connected to said case and to said hinge, said paddle being rotatably mounted about said spring hinge on the axis of said cylinder for limited angular motion of said paddle about the said axis and with respect to said case on angular acceleration of said case, said hinge restraining motion of said paddle with respect to said case in the absence of angular acceleration of said case about said axis, said paddle extending from one wall to the opposing wall and immersed in said liquid, opposing edges of said paddle being adjacent the opposing cylindrical walls, an edge of each side of the paddle being spaced from the adjacent wall of the chamber, a baffle positioned in said chamber parallel to said paddle and spaced therefrom, and a motion sensing device connected to said paddle to sense the angular displacement of said paddle.

7. A motion sensing device comprising a case, a closed chamber in said case, said chamber being in the form of a cylinder and having opposing cylindrical walls, a liquid inertial mass in said chamber, a paddle in said chamber and immersed in said liquid, said paddle being of substantially no effective mass when immersed in said liquid, said liquid being the inertial mass and the effective rotor of said device, a hinge for said paddle, said hinge being connected to said paddle, a mounting for said hinge in said chamber, said mounting being connected to said case and to said hinge, said paddle being rotatably mounted about said hinge on the axis of said cylinder, for limited angular motion of said paddle about said axis and with respect to said case on angular acceleration of said case about said axis, said paddle extending from one wall to the opposing wall, opposing edges of said paddle being adjacent the opposing cylindrical walls, said hinge restraining motion of said paddle with respect to said case about said axis, and a motion sensing device connected to said paddle to sense the angular displacement of said paddle with respect to said case.

8. A motion sensing device comprising a case, a closed chamber in said case, said chamber being in the form of a cylinder and having opposing cylindrical walls, a liquid inertial mass in said chamber, a paddle in said chamber and immersed in said liquid, said paddle being of substantially no effective mass when immersed in said liquid, said liquid being the inertial mass and the effective rotor of said device, a hinge for said paddle, said hinge being connected to said paddle, a mounting for said hinge in said chamber, said mounting being connected to said case and to said hinge, said paddle being rotatably mounted about said hinge on the axis of said cylinder, for limited angular motion of said paddle about said axis and with respect to said case on angular acceleration of said case about said axis, said paddle extending from one wall to the opposing wall, opposing edges of said paddle being adjacent the opposing cylindrical walls, an edge of said paddle being spaced from the adjacent cylindrical wall of the case, said hinge restraining motion of said paddle with respect to said case in the absence of angular acceleration of said case about said axis, and a motion sensing device connected to said paddle to sense the angular displacement of said paddle with respect to said case.

9. A motion sensing device comprising a case, a closed chamber in said case, said chamber being in the form of a cylinder and having opposing cylindrical walls, a liquid inertial mass in said chamber, a paddle in said chamber and immersed in said liquid, said paddle being of substantially no effective mass when immersed in said liquid, said liquid being the inertial mass and the effective rotor of said device, a hinge for said paddle, said hinge being connected to said paddle, a mounting for said hinge in said chamber, said mounting being connected to said case and to said hinge, said paddle being rotatably mounted about said hinge on the axis of said cylinder, for limited angular motion of said paddle about said axis and with respect to said case on angular acceleration of said case about said axis, said paddle extending from one wall to the opposing wall, opposing edges of said paddle being adjacent the opposing cylindrical walls, an edge of each side of the paddle being spaced from the adjacent wall of the case, a baffle positioned in said chamber parallel to said paddle and spaced therefrom, said hinge restraining motion of said paddle with respect to said case in the absence of angular acceleration of said case about said axis, and a motion sensing device connected to said paddle to sense the angular displacement of said paddle with respect to said case.

10. A motion sensing device, comprising a case, a closed chamber in said case, a liquid inertial mass in said chamber, a hollow paddle in said chamber immersed in said liquid, said paddle being of substantially no effective mass when immersed in said liquid, said liquid being the inertial mass and the effective rotor of said device, a mounting for said paddle fixedly mounted in said chamber and connected to said case, said paddle being movably mounted in said chamber with one edge of said paddle adjacent, but out of contact with, an enclosing wall of said chamber, the separation between the edge of the paddle and said wall forming a fluid communicating passageway, said paddle being positioned on said mounting for limited motion on said mounting with respect to said case on acceleration of said case, said mounting restraining motion of said paddle with respect to said case in the absence of acceleration of said case, and means for sensing said motion.

11. A motion sensing device, comprising a case, a closed chamber in said case, a liquid inertial mass in said chamber, a hollow paddle in said chamber immersed in said liquid, said paddle being of substantially no effective mass when immersed in said liquid, said liquid being the inertial mass and the effective rotor of said device, a mounting for said paddle fixedly mounted in said chamber and connected to said case, said paddle being movably mounted in said chamber with one edge of said paddle adjacent, but out of contact with, an enclosing wall of said chamber, a baffle positioned in said chamber extending along said paddle and spaced therefrom, a liquid communication passageway for fluid movement from one side of said paddle to the other side of said paddle and between the edge of said paddle and said wall and between said paddle and said baffle, said paddle being positioned on said mounting for limited angular motion on said mounting with respect to said case on angular acceleration of said case, said mounting restraining motion of said paddle with respect to said case in the absence of angular acceleration of said case, and means for sensing said motion.

12. A motion sensing device, comprising a case, a closed chamber in said case, said chamber being in the form of a cylinder and having opposing cylindrical walls, a liquid inertial mass in said chamber, a hollow paddle of substantially no effective mass when immersed in said liquid, said liquid being the inertial mass and the effective rotor of said device, a spring hinge for said paddle, said spring hinge being connected to said paddle, a mounting in said chamber for said hinge, said mounting being connected to said case and to said hinge, said paddle being rotatably mounted about said spring hinge on the axis of said cylinder for limited angular motion of said paddle about the said axis and with respect to said case on angular acceleration of said case, said hinge restraining motion of said paddle with respect to said case in the absence of angular acceleration of said case about said axis, said paddle extending from one wall to the opposing wall and immersed in said liquid, opposing edges of said paddle being adjacent the opposing cylindrical walls, and a motion sensing device connected to said paddle to sense the angular displacement of said paddle.

13. A motion sensing device, comprising a case, a closed chamber in said case, said chamber being in the form of a cylinder and having opposing cylindrical walls, a liquid inertial mass in said chamber, a hollow paddle of substantially no effective mass when immersed in said liquid, said liquid being the inertial mass and the effective rotor of said device, a spring hinge for said paddle, said spring hinge being connected to said paddle, a mounting in said chamber for said hinge, said mounting being connected to said case and to said hinge, said paddle being rotatably mounted about said spring hinge on the axis of said cylinder for limited angular motion of said paddle about the said axis and with respect to said case on angular acceleration of said case, said hinge restraining motion of said paddle with respect to said case in the absence of angular acceleration of said case about said axis, said paddle extending from one wall to the opposing wall and immersed in said liquid, opposing edges of said paddle being adjacent the opposing cylindrical walls, an edge of said paddle being spaced from the adjacent cylindrical wall of the chamber, and a motion sensing device connected to said paddle to sense the angular displacement of said paddle.

14. A motion sensing device, comprising a case, a closed chamber in said case, said chamber being in the form of a cylinder and having opposing cylindrical walls, a liquid inertial mass in said chamber, a hollow paddle of substantially no effective mass when immersed in said liquid, said liquid being the inertial mass and the effective rotor of said device, a spring hinge for said paddle, said spring hinge being connected to said paddle, a mounting in said chamber for said hinge, said mounting being connected to said case and to said hinge, said paddle being rotatably mounted about said spring hinge on the axis of said cylinder for limited angular motion of said paddle about the said axis and with respect to said case on angular acceleration of said case, said hinge restraining motion of said paddle with respect to said case in the absence of angular acceleration of said case about said axis, said paddle extending from one wall to the opposing wall and immersed in said liquid, opposing edges of said paddle being adjacent the opposing cylindrical walls, an edge of each side of the paddle being spaced from the adjacent wall of the chamber, a baffle positioned in said chamber parallel to said paddle and spaced therefrom, and a motion sensing device connected to said paddle to sense the angular displacement of said paddle.

15. A motion sensing device comprising a case, a closed chamber in said case, said chamber being in the form of a cylinder and having opposing cylindrical walls, a liquid inertial mass in said chamber, a hollow paddle in said chamber and immersed in said liquid, said paddle being of substantially no effective mass when immersed in said liquid, said liquid being the inertial mass and the effective rotor of said device, a hinge for said paddle, said hinge being connected to said paddle, a mounting for said hinge in said chamber, said mounting being connected to said case and to said hinge, said paddle being rotatably mounted about said hinge on the axis of said cylinder, for limited angular motion of said paddle about said axis and with respect to said case on angular acceleration of said case about said axis, said paddle extending from one wall to the opposing wall, opposing edges of said paddle being adjacent the opposing cylindrical walls, said hinge restraining motion of said paddle with respect to said case about said axis, and a motion sensing device connected to said paddle to sense the angular displacement of said paddle with respect to said case.

16. A motion sensing device comprising a case, a closed chamber in said case, said chamber being in the form of a cylinder and having opposing cylindrical walls, a liquid inertial mass in said chamber, a hollow paddle in said chamber and immersed in said liquid, said paddle being of substantially no effective mass when immersed in said liquid, said liquid being the inertial mass and the effective rotor of said device, a hinge for said paddle, said hinge being connected to said paddle, a mounting for said hinge in said chamber, said mounting being connected to said case and to said hinge, said paddle being rotatably mounted about said hinge on the axis of said cylinder, for limited angular motion of said paddle about said axis and with respect to said case on angular acceleration of said case about said axis, said paddle extending from one wall to the opposing wall, opposing edges of said paddle being adjacent the opposing cylindrical walls, an edge of said paddle being spaced from the adjacent cylindrical wall of the case, said hinge restraining motion of said paddle with respect to said case in the absence of angular acceleration of said case about said axis, and a motion sensing device connected to said paddle to sense the angular displacement of said paddle with respect to said case.

17. A motion sensing device comprising a case, a closed chamber in said case, said chamber being in the form of a cylinder and having opposing cylindrical walls, a liquid inertial mass in said chamber, a hollow paddle in said chamber and immersed in said liquid, said paddle being of substantially no effective mass when immersed in said liquid, said liquid being the inertial mass and the effective rotor of said device, a hinge for said paddle, said hinge being connected to said paddle, a mounting for said hinge in said chamber, said mounting being connected to said case and to said hinge, said paddle being rotatably mounted about said hinge on the axis of said cylinder, for limited angular motion of said paddle about said axis and with respect to said case on angular acceleration of said case about said axis, said paddle extending from one wall to the opposing wall, opposing edges of said paddle being adjacent the opposing cylindrical walls, an edge of each side of the paddle being spaced from the adjacent wall of the case, a baffle positioned in said chamber parallel to said paddle and spaced therefrom, said hinge restraining motion of said paddle with respect to said case in the absence of angular acceleration of said case about said axis, and a motion sensing device connected to said paddle to sense the angular displacement of said paddle with respect to said case.

References Cited in the file of this patent

UNITED STATES PATENTS

| Re. 14,545 | Benecke | Nov. 5, 1918 |
| 2,347,962 | Oliver | May 2, 1944 |
| 2,453,548 | Statham | Nov. 9, 1948 |